Jan. 7, 1947.  W. LANG  2,413,875
PUNCHING MACHINE
Filed Oct. 9, 1943  7 Sheets-Sheet 1

FIG. 1.

INVENTOR
WILLIAM LANG.
BY
W. M. Wilson
ATTORNEY

Fig. 2.

Jan. 7, 1947.  W. LANG  2,413,875
PUNCHING MACHINE
Filed Oct. 9, 1943  7 Sheets-Sheet 4

INVENTOR
WILLIAM LANG
BY
ATTORNEY

Jan. 7, 1947.  W. LANG  2,413,875
PUNCHING MACHINE
Filed Oct. 9, 1943   7 Sheets-Sheet 5

Jan. 7, 1947.  W. LANG  2,413,875
PUNCHING MACHINE
Filed Oct. 9, 1943  7 Sheets-Sheet 7

INVENTOR
WILLIAM LANG
BY
ATTORNEY

Patented Jan. 7, 1947

2,413,875

UNITED STATES PATENT OFFICE 2,413,875

PUNCHING MACHINE

William Lang, New York, N. Y., assignor to International Business Machines Corporation, New York, N. Y., a corporation of New York Application October 9, 1943, Serial No. 505,680

18 Claims. (Cl. 164—115)

1

This invention relates generally to printing and printing-line control punching machines and refers more particularly to improvements in machines of the character set forth in the Bryce Patent 1,608,837, granted November 30, 1936, and the Daubmeyer Patent 2,157,980, granted May 9, 1939. In both of these prior patents, a file or series of cards is fed through the machine, and data already perforated in the cards is sensed as the cards pass a sensing position. In the Bryce patent the sensed perforations cause the machine to print data back on the card containing the perforations, and in the Daubmeyer patent the sensed perforations cause printing on the next succeeding card in the series. In the latter patent there is a limitation that data may be printed on what might be termed a "master" card from only a single preceding detail card, and such information is printed in only certain restricted parts of the master card.

The principal object of the present invention resides in the provision of an improved printing machine, wherein a single file of cards containing master cards followed by one or more detail cards will operate, so that data on each of the detail cards will be printed on the preceding master card. Such printing will be selected in fields and positions within the fields as determined by the detail cards themselves.

Another object of the invention is to provide an alternate manner of operation in the machine, wherein each of the detail cards will print on a successive line of the master card beginning with the next available printing position on such master card.

A further object of the invention is to provide a machine in which a single file of master and detail cards are handled, and the data of the detail cards is recorded on the related master card, with the further provision that the detail cards may be separated out from the master cards to form two separate files or the cards may be retained in a single file.

Another object of the invention is to provide a posting machine in which improved devices are incorporated for effecting the punching of printing line control in one record under control of one or more other source records.

Other objects of the invention will be pointed out in the following description and claims and illustrated in the accompanying drawings, which disclose, by way of example, the principle of the invention and the best mode, which has been contemplated, of applying that principle.

2

The record cards

Figure 7:
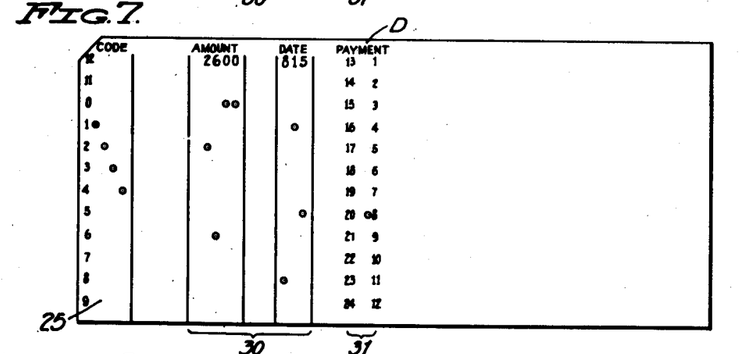
Figure 8:
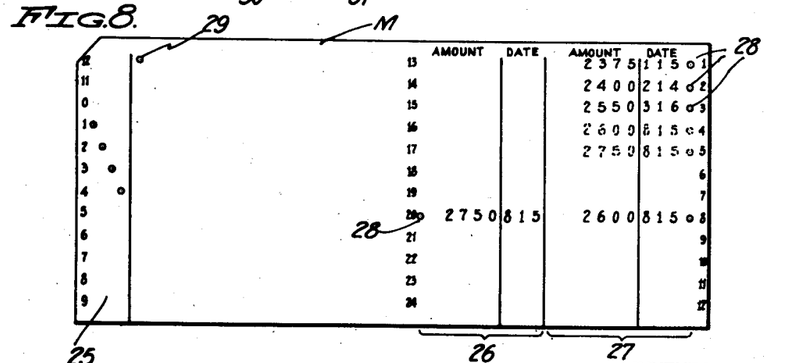
Fig. 8 shows a master or ledger card.

Fig. 8 represents a master or ledger card which is in the form of the well known Hollerith record card, which is provided with the usual twelve horizontal rows of perforation receiving positions, which are intersected by vertical lines representing columnar positions. At the left end of the card several vertical lines form a field designated 25, in which a code number, such as 1234, has been perforated in accordance with the usual practice. This field 25 is also provided in each of the detail cards (Figs. 6 and 7), wherein the same code number has been perforated to identify these detail cards as being related to the master card. In a file of cards to be passed through the machine there will be a master card designated M in Fig. 8 and one or more detail cards designated D (Figs. 6 and 7), which have been previously arranged so that cards of the same code number are grouped together with the master card M leading.

Figure 6:
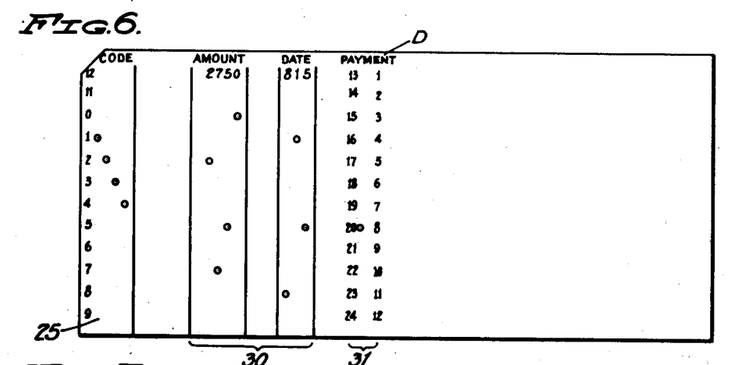
Figs. 6 and 7 are a pair of detail cards.

As an example of a practical application, the master card may contain written data representing the details of a transaction, such as the purchase of some commodity which is to be paid for in installments. For this purpose, the card is provided with two fields designated 26 and 27, each of which has twelve lines on which the machine will record amounts and dates as indicated. Whenever printing is effected on a line of either field, a so-called line finding perforation 28 will be made in the card. The master card M is also provided with a distinguishing designation 29 made in the uppermost position of a selected column. Whenever a transaction is negotiated with a customer, ledger card M is placed in the file and the customer is provided with a set of detail cards D, one for each installment to be paid. Each of these cards is provided with the appropriate code perforation in its field 25, and perforations in a field 30 of the detail cards represent the amount of the installment and the due date. In the further field 31 comprising two columns, there is perforated, one of the twenty-four positions, representing the number of the particular payment. Thus, for example, the card in Fig. 7 represents the 8 payment, while the card in Fig. 6 represents the 20 payment.

When the customer makes a payment, the appropriate card D is returned therewith and placed in the file following the corresponding master card M, and during an interval of time several of these cards may have accumulated, so that when it is desired to post the data on the master card, there may be one or more detail cards in the file accompanying the master card.

The machine may be arranged for two different types of operation, the first of which is as follows: Each detail card may control the printing of the amount and date perforated therein on the printing line of card M corresponding to the payment number of the detail card. Thus, the card of Fig. 7 will cause printing of its amount 2600 and date 815 on the 8 printing line, and the card of Fig. 6 will print its amount 2750 and date 815 on the printing line designated 20 of Fig. 8. In this type of operation, each detail card will select the particular field and line of the master card and record therein.

In the second type of operation, the payment field 31 of the detail cards is not perforated and may be omitted entirely, and in the operation of the machine each detail card will record on the next succeeding available line of the master card. Thus, for example, if the master card had, through some previous operation, received recording on printing lines 1, 2 and 3 thereof, the card of Fig. 7 would cause printing on the next available line, namely, line #4, as indicated by the dotted numerals, and the card of Fig. 6 will thereafter record its data on the next line.

Figure 1:
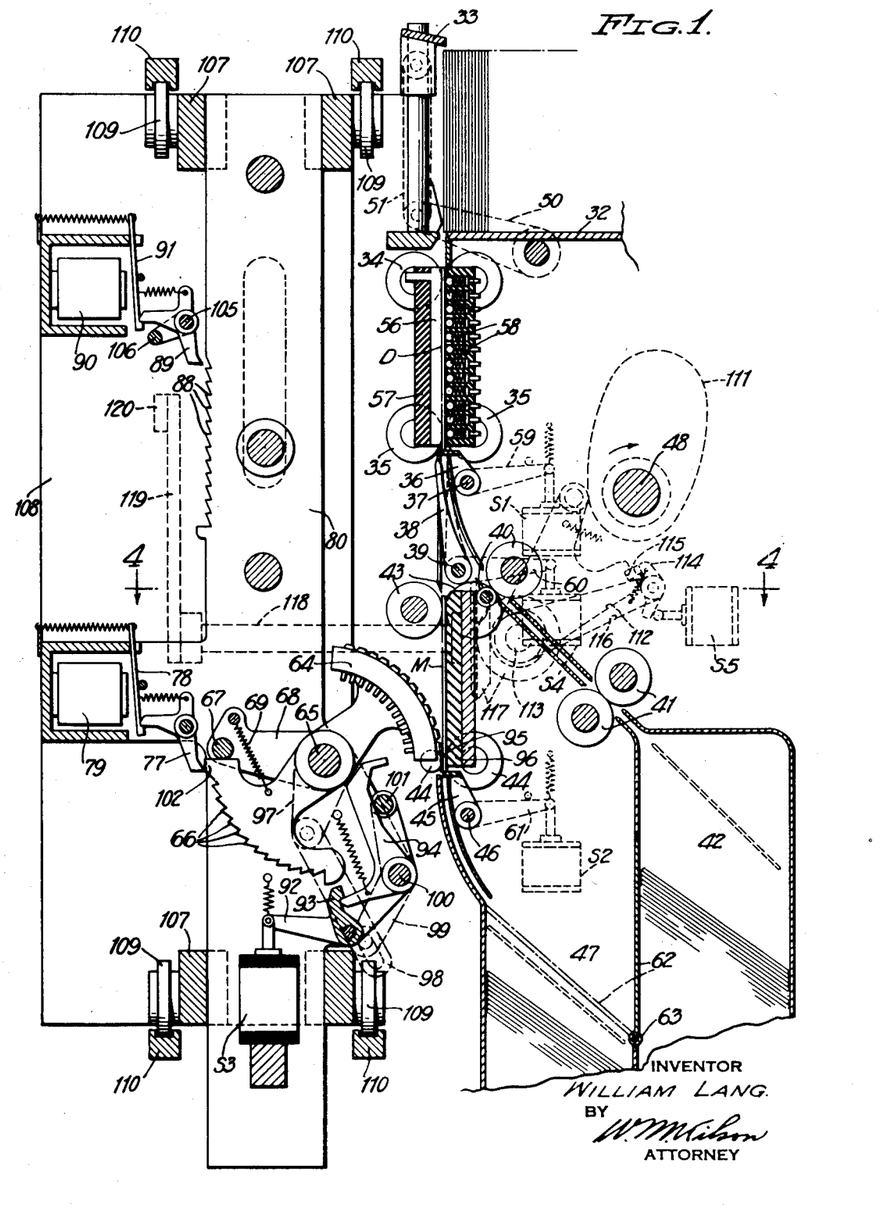
Fig. 1 is a central section of the machine showing the card sensing, printing and feeding devices.

Referring now to Fig. 1 the file of cards is placed in supply magazine 32 with the master cards M preceding or to the left of their related detail cards D. From the magazine they are fed downwardly one at a time by a vertically reciprocable picker knife 33, which advances the card to pairs of feed rollers 34 and 35 which convey it to a shutter or stop 36. This stop is secured on a rod 37 which, when rocked clockwise, will release the card for further advance by the rollers. In the path of the card directly below stop 36, the deflector 38 is mounted on a rod 39. For the further advance of detail cards, the deflector 38 assumes the full line position in Fig. 1, so that the card passes to pairs of rollers 40 and 41 which convey it to a discharge pocket 42. Where the card to be advanced is a master card, the deflector 38 is rocked to its dotted line position, so that the card continues traveling in the same vertical plane to pairs of rollers 43 and 44, which advance it against a second stop 45 which is mounted on rod 46. Subsequent rocking of this stop out of the path of the card will enable the rollers 44 to advance it into a hopper 47. Generally speaking, all master cards will travel a straight vertical path for conveyance to pocket 47, while all detail cards will be deflected into the pocket 42.

Figure 2:
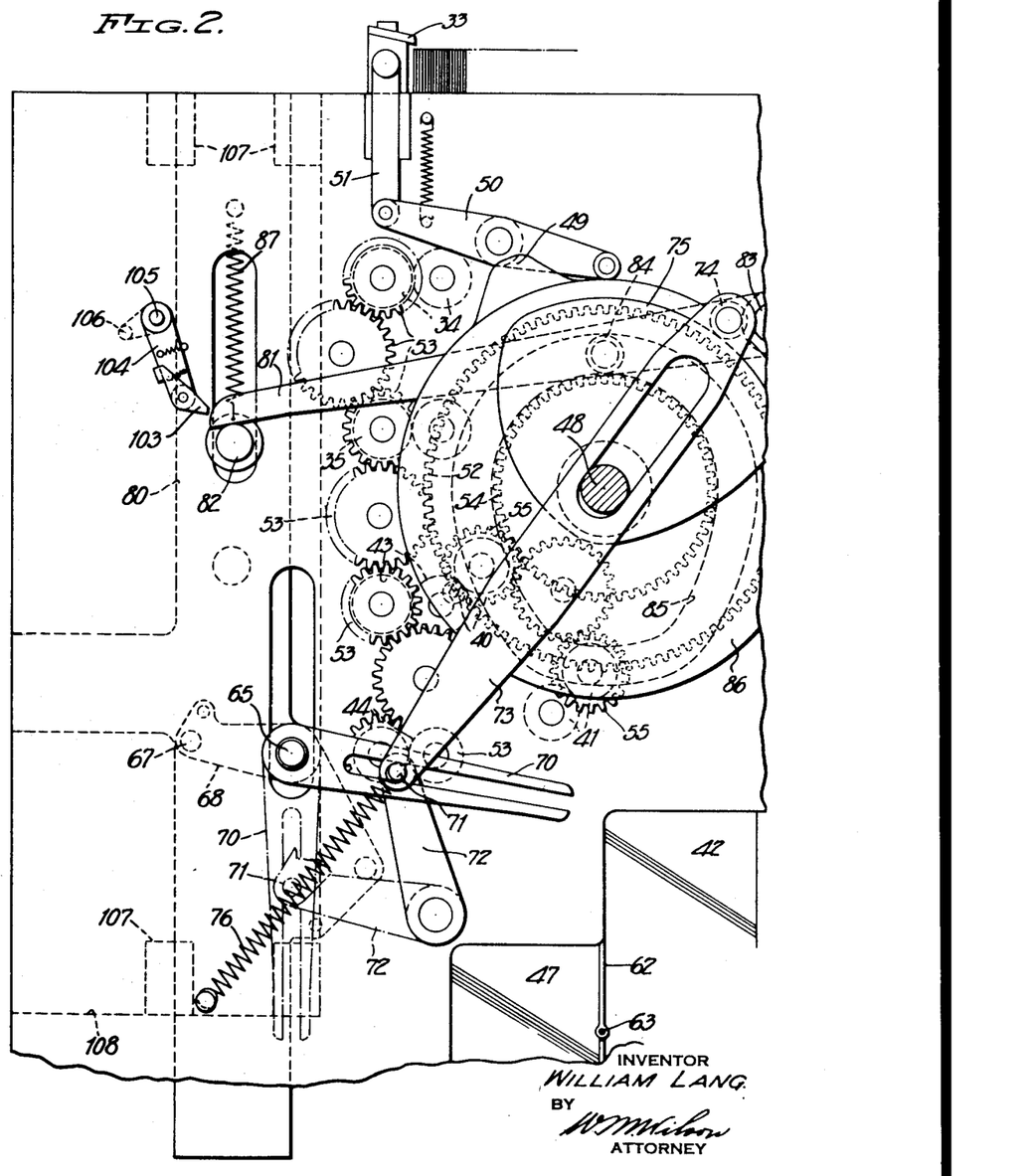
Fig. 2 is a side elevation of the machine looking in the same direction as Fig. 1.
Figure 5:
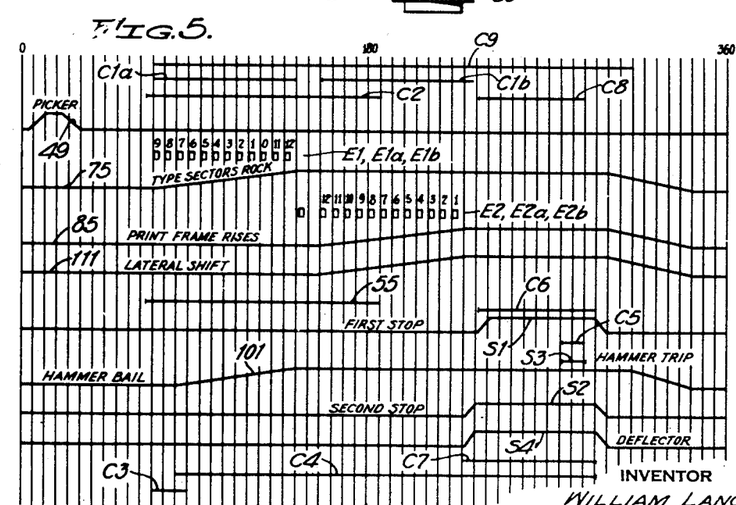
Fig. 5 is a timing chart of the operating cams and contacts.

Referring to Fig. 2, 48 represents the main drive shaft of the machine which makes one revolution, during which various cams control mechanism at times indicated in the time chart of Fig. 5. Thus, with the cards placed in the magazine, a cam 49 (Figs. 2 and 5) will reciprocate picker 33 through a pivoted follower arm 50 and link 51. The pairs of rollers 34, 45, 43, 44 have one of their rollers positively driven at a rapid rate from the gear 52 mounted on shaft 48 through a train of gears generally designated 53. It is thus seen that only one of a pair of rollers is driven, and such roller is in constant rotation during the revolution of shaft 48 so that, when the advance of the card is interrupted by either of the stops 36 or 45, the rollers will simply slip on the card. The pairs of detail card feed rollers 40 and 41 are similarly driven from a gear 54 located on shaft 48 behind gear 52, as viewed in Fig. 2, through a train of gears designated 55.

With the card in position against stop 36 (Fig. 1), the vertical columns thereof will be in alignment with contact strips 56 of which there is one for each of the card columns that are to be sensed, and these strips are separately mounted in an insulating block 57.

On the opposite side of the card are individual spring pressed contact balls 58 arranged in rows of columns to contact the possible punching positions of the cards. When the card is in this position, circuits completed through the perforations therein, as will be more particularly pointed out in connection with the circuit diagram, ascertain whether the card is a master card or a detail card and control the mechanism accordingly. In this position it is also ascertained whether the recording is to take place in positions 1—12 of the master card or positions 13—24.

Later, at the time indicated by the line designated S1 in Fig. 5, the solenoid S1 in Fig. 1 is energized to rock rod 37 through arm 59, and just prior to this, if the card is ascertained to be a master card the solenoid S4 is energized to rock rod 39 and deflector 38 through an arm 60, so that the master card will be advanced to stop 45. From this latter position the card is released through energization of solenoid S2, which through arm 61 will rock the rod 46 and stop 45.

It was mentioned previously that the detail cards go into pocket 42 and the master card into pocket 47. This, of course, effects a separation of the two types of cards. Where it may be desirable to retain the cards in a single file, a section of the left hand side wall of pocket 42 designated 62 is rocked counterclockwise about the pivot point 63, to the inclined broken line position shown, to form a guiding surface along which the master card will slide to enter pocket 42. In this manner all the cards will eventually arrive in a single pocket.

*Printing mechanism*

The printing mechanism comprises a group of type sectors 64 mounted upon a shaft 65 having ratchet teeth 66 opposite the type head. The sectors are normally held in the position shown in Fig. 1 by a cross bar 67 carried by arms 68 secured to shaft 65, and they are urged in a clockwise direction by spring 69.

Referring to Fig. 2, the shaft 65 has secured thereto a forked lever 70 which cooperates with a pin 71 which passes through an arm 72 and a link 73. The opposite end of link 73 is provided with a roller 74 cooperating with a cam 75 on shaft 48, so that as the cam revolves, link 73 is pulled downwardly toward the left by spring 76 and through arms 72 and 70 shaft 65 is rocked clockwise carrying therewith the type sectors 64. During such movement the teeth 66 pass the nose of a stopping pawl 77 in succession. This pawl is normally latched as shown in Fig. 1 by the armature 78 of a magnet 79, and at differential times magnet 79 will be energized under control of the perforations sensed in the detail cards, and pawl 77 will be released to engage one of the teeth 66 to present the appropriate type element to a printing line, which is along the line horizontal to the axis of the shaft 65.

The printing mechanism is normally positioned as in Fig. 1 to print on the lowermost line of the master card, and printing is effected on higher lines by differentially positioning the entire printing mechanism vertically. For this purpose, the shaft 65 is rotatably mounted in a pair of vertically slidable bars 80 which are normally held in their lowermost position through engagement of a lever 81 with a rod 82 (see Fig. 2) extending from the bars 80. The lever 81 is pivoted at 83 and has a roller 84 extending into cam groove 85 of a box cam 86. As the cam rotates, arm 81 is rocked clockwise and through spring 87 the bars 80 are elevated, carrying therewith the shaft 65 and magnets 79. This elevation takes place after the shaft 65 has been rocked, so that at such time the arm 78 is in the broken line position shown in Fig. 2, in which pin 71 is in vertical alignment with shaft 65 and permits upward movement of the shaft.

Figure 3:
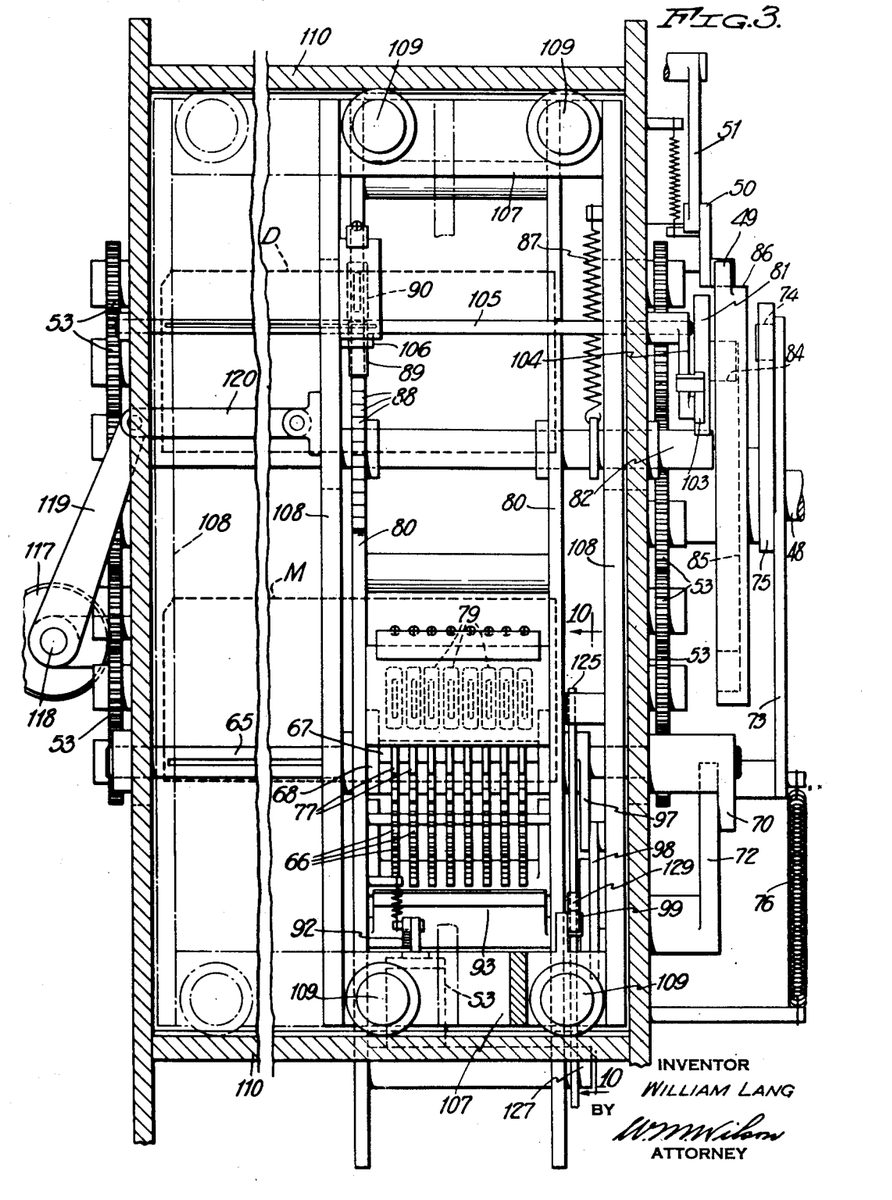
Fig. 3 is an end elevation of the machine looking from the left in Figs. 1 and 2.

Referring to Figs. 1 and 3, one of the bars 80 is provided with teeth 88, with which a pawl 89 cooperates. During the upward movement of the bars 80, a magnet 90 may be energized to attract its armature 91 and release pawl 89 for engagement with a selected tooth 88 and thus interrupt the printing mechanism in position to print on a selected vertical line of the master card. After the type sector has been positioned arcuately and bars 80 have been positioned vertically, solenoid S3 (Fig. 1) is energized and through arm 92 will rock latching bar 93 counterclockwise to release spring pressed printing hammers 94, which will then strike the type elements in horizontal alignment with shaft 65 and make a record upon the selected line of the master card through an inked ribbon generally designated at 95 against a platen 96.

Referring to Figs. 1 and 3, shaft 65 is provided with an arm 97 which, through a link 98 rocks an arm 99 on the shaft 100 to which is secured the hammer bail 101. Thus, when the shaft 65 rocks clockwise to enable arcuate positioning of the type sectors, the bail 101 is rocked in the same direction away from the hammers 94 so that, when the latching bar 93 is tripped, the hammers will be free to strike the type. Upon return movement of shaft 65, the type sectors will be restored and the hammer bail 101 will concurrently operate to relatch the hammers on the latching bar 93. Each type sector is provided with a camming portion 102 which at the end of the restoring stroke of the sector will rock the related stopping pawl 77 to relatch it on its armature 78. Also, when the bars 80 are restored downwardly by lever 81 (Fig. 2), the extreme end of the lever will engage a spring pressed by-pass 103 pivoted on the end of arm 104 secured to rod 105 which carries a cross bar 106 (see Fig. 1) to restore the stopping pawls 89 to their latched positions on armatures 91.

Referring to Figs. 1 and 3, the vertically positionable bars 80 are vertically slidable in blocks 107, which blocks serve to connect a pair of plates 108, one of which supports the magnet 90 and the line locating pawl 89. These blocks 107 are also provided with rollers 109 for travel in stationary guide rails 110, so that the plates 108 may be shifted to the left as viewed in Fig. 3, carrying therebetween the printing mechanism. With the normal position of the plates as shown in Fig. 3, the printing mechanism is positioned to record in field 27 on the master card (see Fig. 8) and, when shifted toward the left to the broken line position indicated, the type sectors will be aligned for recording in field 26 of the master card. Mechanism for bringing about this shift comprises a cam 111 (Fig. 1) secured on shaft 48 which rocks a follower arm 112 freely mounted on a shaft 113, so that in the normal operation the cam simply oscillates the follower 112 about the shaft 113.

When it is required to record in field 26 of the card, a solenoid S5 (Fig. 1) is energized and thereby releases a spring pressed dog 114 for engagement in a notch 115 of the lever 112. This will couple arm 116 to lever 112 and, since arm 116 is secured to shaft 113, the latter will be rocked and through a pair of beveled gears 117 will rock shaft 118 (see Fig. 3). The extremity of this shaft has secured thereto an arm 119 connected through a link 120 to one of the frames 108. Thus, if coupling is effected by solenoid S5, frame 108 is shifted to its alternate position, this being prior to the tripping of the hammers, so that when the latter are tripped, recording will take place on one of the lines 13—24 of the master card.

Figure 4:
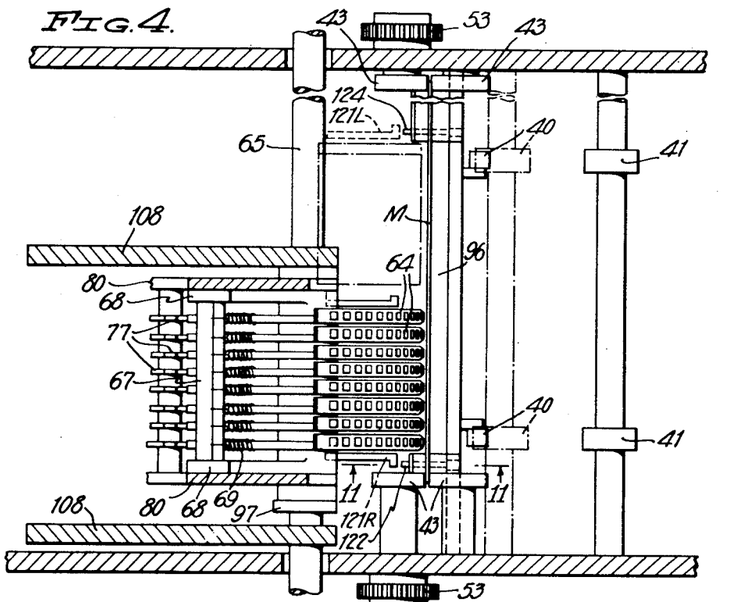
Fig. 4 is a sectional view taken along lines 4—4 of Fig. 1.

In Fig. 4 the type sectors 64 are shown in full line position to print on one of the lines 1—12 of the master card, and in dotted outline is shown their relative position for recording on lines 13—24. On either side of the type sectors is provided a pivoted punch hammer designated 121R and 121L (see Fig. 11). The construction of this hammer is similar to that of the print hammers, and it is actuated in the same manner. With the printing mechanism in its normal non-shifted position, the hammer 121R is in line with a vertical column of spring pressed punch plungers 122 and, when the printing hammers are tripped, the hammer 121R will strike one of the plungers 122 to force such plunger toward the card M into an appropriate die 123 to effect a perforation 28 (see Fig. 8) along the same line on which printing occurs. When the printing frame is shifted to its alternate position, the second punch hammer 121L is in line with a similar row of punch plungers designated 24 of Fig. 4 so that, when printing takes place in columns 13—24, the perforation 28 is effected in the column at the left of the printed figures as indicated in Fig. 8.

Figure 9:
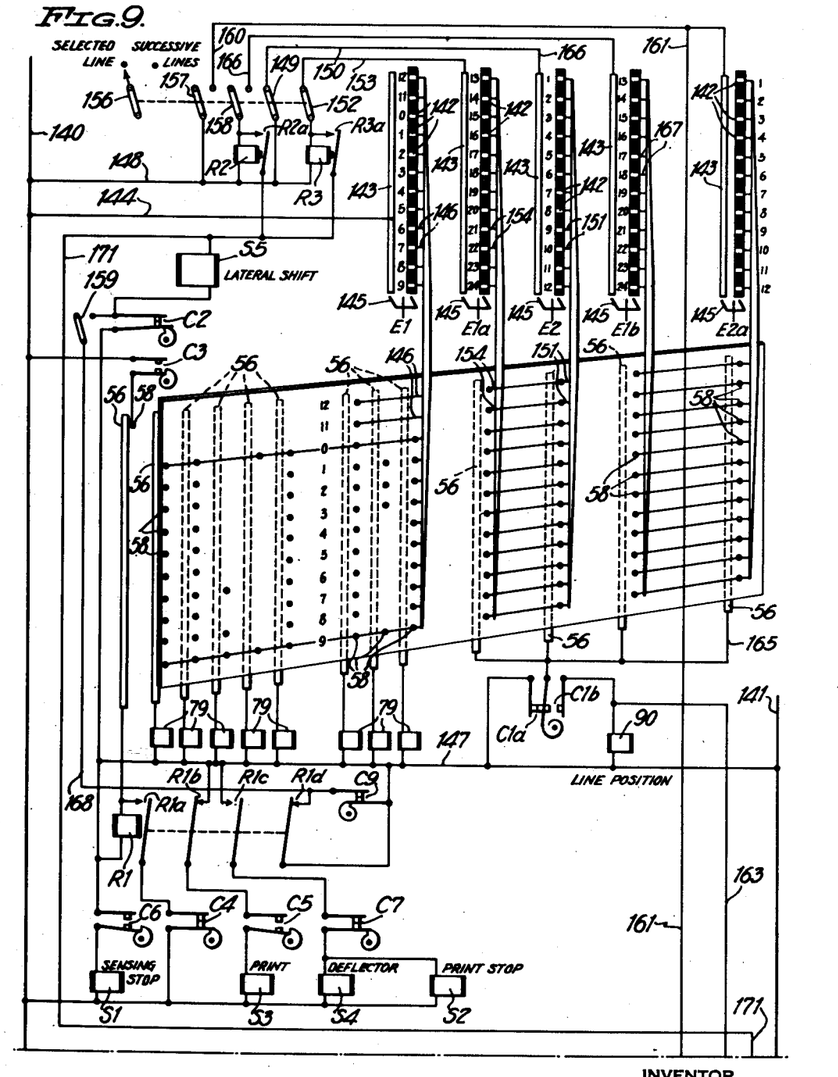
Figs. 9 and 9a arranged with Fig. 9a below Fig. 9 constitute a wiring diagram of the electrical circuits of the machine.
Figures 9A, 10, 11:
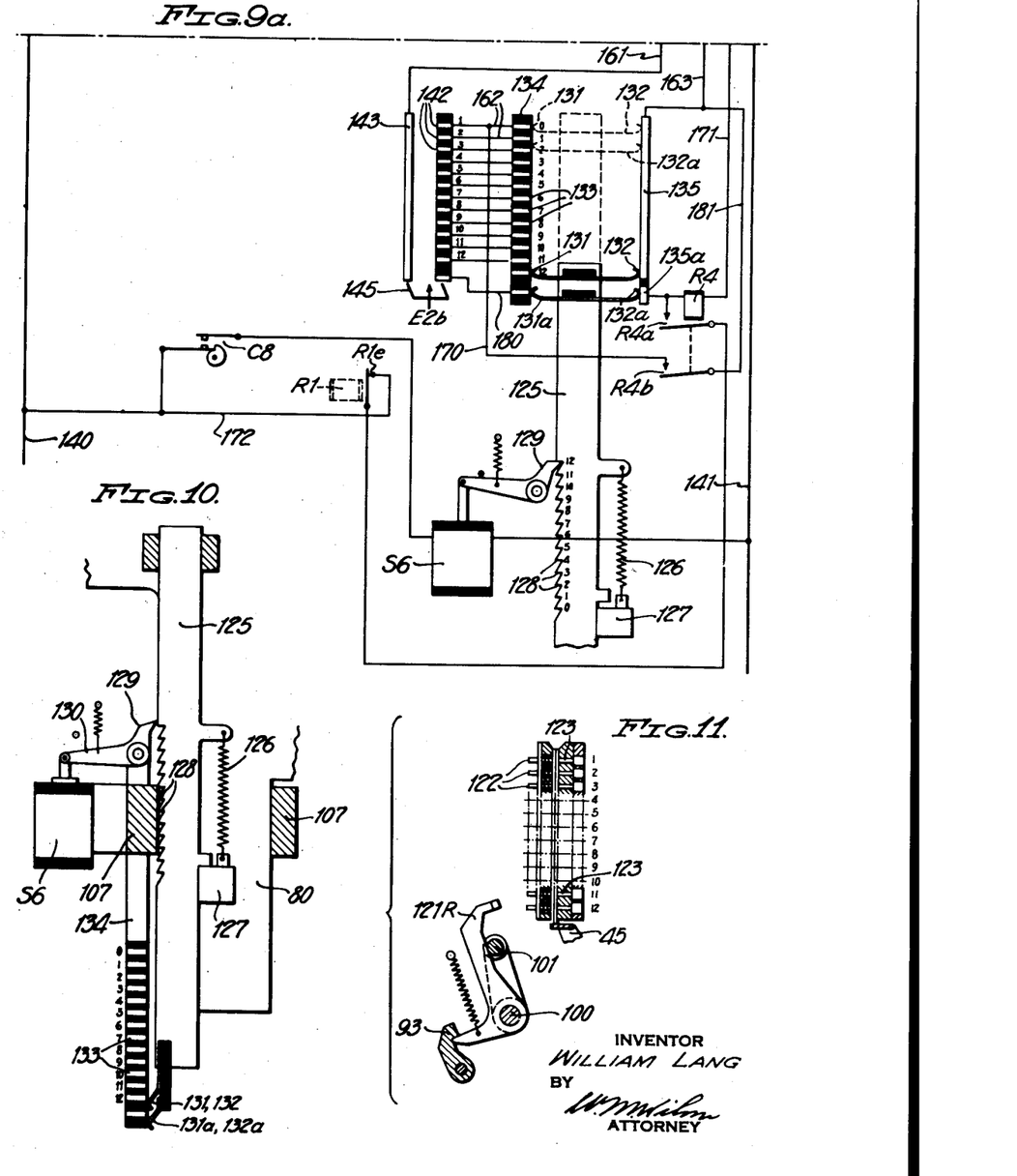
Fig. 10 is a detail section taken on lines 10—10 of Fig. 3.
Fig. 11 is a punch operating mechanism, the view being taken on lines 11—11 of Fig. 4.

Referring to Fig. 10, there is shown a line finding device which functions during the alternate operation of the machine, wherein recording is effected on the next available line of the master card. This mechanism comprises a vertically slidable bar 125 which is normally held by a spring 126 against a block 127 carried by the vertically slidable bar 80. The bar 125 is provided with teeth 128 for cooperation with a pawl 129 pivoted on a cross bar 107. When the bar 80 which carries the type sectors is moved vertically upwards, it will carry therewith the bar 125 and in doing so the teeth 128 will ratchet across the pawl 129, which will retain the bar 125 in the position to which it has been raised and will prevent restoration thereof when the bar 80 is lowered. Restoration may ultimately be effected upon energization of a solenoid designated S6 which through an arm 130 will rock pawl 129 out of engagement with the ratchet teeth and permit spring 126 to restore the bar. The lower end of the bar carries a pair of contact springs 131, 132 one behind the other, the former of which successively contacts segments 133 in an insulating bar 134, while the latter slides along a common conducting strip 135 which is shown diagrammatically in Fig. 9a.

On the shaft 48 are carried several contact operating cams which are diagrammatically represented in the circuit and whose timing is represented in Fig. 5, so that the detailed construction of these well known devices is not shown.

Circuit diagram

The complete operation of the machine will now be explained in connection with the circuit diagram to set forth the sequence of operations occurring in the handling of a representative group of record cards, specifically the cards shown in Figs. 6, 7 and 8. For this group of cards it is assumed that each detail card will print on a line of the ledger card to be selected by the detail card itself. Referring now to Figs. 9 and 9a, current is supplied from a suitable source to main lines designated 140 and 141, and with the cards placed in magazine 32 of Fig. 1 the driving motor (not shown) is placed in operation to cause rotation of shaft 48, so that the cams thereon commence to rotate. The first card which is a master card M will now be advanced by the picker 33 to the first pair of feed rollers 34 which bring it against the first stop 36. In this position the card is sensed by the contact balls 58 and strips 56, so that wherever a perforation occurs, electrical contact is made between ball 58 and strip 56 through such perforation.

While the card is in this sensing position, several so-called emitters function. These emitters are generally designated E in Figs. 9 and 9a and comprise a movable brush preferably mounted on shaft 48, which traverses a succession of contact segments to connect them in succession with a common conductor. In Fig. 9 the segments are generally designated as 142 and the common strips as 143. In the circuit diagram the times in the cycle at which such emitter contacts are made are indicated. As seen from Fig. 5, the cam 75 operates to rock the type sectors as emitter E1 functions, and during this period the type sectors are selectively positioned through circuits traceable in Fig. 9 from line 140, wire 144, common strip 143 of emitter E1, brush 145 of the emitter, segments 142, to wires 146. The wire 146 connected to the 9 segment 142 is connected to the contact balls 58 that sense the 9 perforation positions in the amount and date fields of the card. The wire 146 connected to the 8 segment 142 is connected to the contact balls 58 that sense the 8 perforation positions in the amount and date fields of the card, and so on. As this first card is a master card containing no such perforations, there will be no circuits completed at this time. Since also for this operation the master card is not to determine the printing line, no circuits will be completed through the hole 28 of the master card. The only perforation sensed in the master card is the hole 29 in Fig. 8, which will enable the completion of a circuit upon the closing of cam contacts C3, traceable from line 140, contacts C3, the contact ball 58 in line with the hole 29, perforation 29, related common strip 56, relay magnet R1, wire 147, to line 141. The magnet R1 closes its contacts R1a to provide a holding circuit traceable from line 140, contacts C4, contacts R1a, magnet R1, wire 147, to line 141.

Accordingly, relay R1 will remain energized until contacts C4 open at the time indicated in Fig. 5. When cam contacts C7 close, a circuit will be traceable from line 140, solenoid S4, contacts C7, relay contacts R1c now closed, wire 147 to line 141. Slightly thereafter, cam contacts C6 close, to energize the solenoid S1 through a circuit from line 140, solenoid S1, contacts C6, wire 147 to line 141. Thus, with both solenoids S1 and S4 energized, the stop 36 is retracted and the deflector 38 is shifted to its dotted line position in Fig. 1, and as a result the master card is advanced to stop 45.

During this cycle, various operations take place idly, since there is no card in printing position during this cycle. At the beginning of the next cycle, the first detail card is advanced to the sensing position against stop 36 so that, when emitter E1 now operates, the circuits previously traced to wires 146 will continue through the perforations in the amount and date columns of the detail card to energize the print magnets 79 and the type sectors will be positioned in accordance with the amount and date. While the emitter E1 functions, a second emitter E1a operating concurrently, analyzes the left hand column of the payment field 31, and if there is any perforation in such column the mechanism for shifting the entire print mechanism laterally will be operated. Since for this first detail card there is no such perforation the shift mechanism will not function at this time.

After the operation of emitter E1, emitters E2, E2a and E2b function and these operate in synchronism with the upward movement of the printing frames 80. For the card of Fig. 7 the perforation representing payment 8 will cause completion of a circuit from line 140, wire 148, switch 149, wire 150, common strip 143 of emitter E2, the related wiper 145, the 8 segment 142, the 8 wire of the group 151, contact 58, common strip 56, contacts C1b (closed during this period) line selecting magnet 90, wire 147, to line 141. This circuit is completed at the time that the appropriate tooth 88 (Fig. 1) is opposite the stopping pawl 89, so that the printing frame 80 is positioned with the selected type elements opposite the 8 printing line of the card, and the line indicating punch hammer is also positioned in readiness to operate the 8 punch plunger 121 of Fig. 11. While the parts are in this adjusted position, the print solenoid S3 is energized through a circuit traceable from line 140 (Fig. 9), solenoid S3, contacts C5, contacts R1b, wire 147, to line 141, and as a result printing and punching take place.

Thereafter, the printing frame is moved downwardly and the type sectors are also restored together with the printing and punching hammers. During this period, the cam contacts C5 close to energize solenoid S1 and, since during this cycle the card deflector is not operated, the first detail card will now advance from sensing position to the hopper 42 and the master card will remain in printing position. During the beginning of the next cycle, the second detail card of Fig. 6 is advanced to sensing position. Again, during the operation of the emitter E1 the type sectors will be rocked in accordance with the amount and date perforations on this detail card. Since this card bears a perforation 20 in the payment field of the card, printing is to be effected in field 26 of the master card requiring that the printing mechanism be shifted laterally. This is brought about as follows: During the rotation of emitter E1a concurrently with emitter E1, a circuit is traceable from line 140 (Fig. 9), wire 148, relay R3, switch 152, wire 153, common strip 143 of emitter E1a, the 20 segment 142, the 20 wire of a group 154, the 20 perforation in the detail card, the related common strip 56, cam contacts C1a closed during this period, wire 147 to line 141. The relay magnet R3 closes its contact R3a to establish a circuit from line 140, wire 148, relay R3, contact R3a, shift solenoid S5, contacts C3, wire 147, to line 141. This circuit will accordingly be maintained until contacts C2 open. As a result, the printing frame is coupled to the shift cam 111 of Fig. 1 and the printing frame will be shifted laterally, while it is also rising vertically as indicated in Fig. 5.

During this vertical rise, the emitter E2 will complete a circuit traceable from line 148, switch 149, wire 150, common 143, the wiper 149, the 8 segment 142, the 8 wire 151, common 56, the perforation in the 20 position of the card, the related common strip 56, contact C1b, and magnet 90, to line 141. This circuit is substantially the same for that traced for the preceding detail card, except that it goes through the 20 hole instead of through the 8 hole of the card. Now when the hammer bail 93 is tripped by solenoid S3, printing will take place in field 26 of Fig. 8 and the perforation 28 will be made at the left of the recorded data as indicated.

Assuming that the next following card is the master card of a new group or account, at the beginning of the next cycle this master card will be advanced to the sensing position so that we now have a master card in both the sensing and printing positions. As already explained, the only perforation sensed in this master card is the hole 29 identifying it as a master card, and as before the relay R1 is energized and will be held through the cam contacts C4. During this cycle, since no print selecting circuits are completed, the type sectors are rocked to their extreme printing position and the printing frame rises to its uppermost position. However, when cam contacts C5 close, the circuit to the hammer bail solenoid S3 will not be completed, since relay contacts R1b in series therewith are opened, and no impression will be taken from the type sectors and no punching operations take place. When cam contacts C7 close, a circuit is completed from line 140, solenoid S2, contacts C7, contacts R1c, wire 147, to line 141, and a parallel circuit is completed through solenoid S4. A third parallel circuit is completed to energize the solenoid S1 through the contacts C6. Thus, at the period indicated in Fig. 5 the first master card is released for advance to the hopper 47 and the following master card advances to the printing position, and in the next cycle the first detail card related to this new master card will be advanced to sensing position, where its analysis will cause positioning of the type bars and printing upon a line selected by perforations in the payment field of the detail card. It will be apparent that where any master card does not have an accompanying or following detail card, such master card will pass through the hopper 47 without receiving any recorded information.

Considering now the case where printing is to be effected on the next available line of the master card and detail cards are not provided with perforations in field 31, for this operation a switch controlling lever 156 (Fig. 9) is shifted from the position designated "selected line" to the position designated "successive lines," and this shift will cause opening of switches 149 and 152 and will close a pair of switches 157 and 158. The opening of switches 149 and 152 will disconnect the emitters E1a and E2 so that, even though perforations are present in field 31 of the detail cards, no circuits will be completed therethrough. In addition, a switch 159 (Fig. 9) is closed. Assuming that the ledger or master card, which has been moved to sensing position as already explained, does not have any prior amount and date recording thereon, so that it also does not have any holes 28 therein, in that case the first printing is to be on line 1 of the master card. As before, the sensing of the special hole 29 will energize relay R1 and hold it energized. Since there are no other holes in the card, no further circuits are completed and, as a result, the type sectors rock to their extreme position and the printing frame moves upwardly to a position where the type elements are presented along the line above the first printing line, that is, the frame is elevated one step beyond the first printing position.

Since this is a master card, the tripping of the hammers will be prevented as explained, so that no effective operation takes place. In advancing to this extreme upper position, the frame 80 has carried with it the bar 125 of Figs. 9a and 10, so that the wiper 131 carried by bar 125 will contact the 0 segment 133, and the companion wiper 132 will contact the common 135. Dog 129 will hold bar 125 in this elevated position where it is retained. In the latter part of the cycle, this master card is advanced to the printing position as explained, and the first detail card will be brought to sensing position at the beginning of the next cycle.

Referring to Figs. 5 and 9a, cam contacts C8 close to energize solenoid S6 after the printing frame 80 has risen its full extent and while it is held in such position, so that the dog 129 is out of engagement with the bar 125 during this interval and permits the bar to contact the block 127 of the frame and take a position therethrough, if it is not already against the block. Thereafter, the pawl 129 is released for engagement with the bar to hold it in position before the printing frame is restored downwardly. Thus, the bar 127 will take a setting representing the last position of the frame. As the first detail card is now sensed, the type sectors will be positioned as formerly. As emitter E2b now operates, a circuit is completed from line 140 (Fig. 9), wire 148, switch 157, wire 160, wire 161 (Fig. 9a), common 143 of emitter E2b, its wiper 145, the 1 segment 142, a wire 162, the 0 segment 133 at which the wiper 131 is now set, thence through wiper 131, wiper 132, common strip 135, wire 163 (Fig. 9), line selecting magnet 90, to line 141. Thus, as the type sectors are positioned in accordance with the amount and date perforations of the first detail card, the printing frame is positioned in its #1 or first line position so that, when the hammers are tripped, the data will be recorded on line 1 of the master card M of Fig. 8, together with the accompanying perforation 28. While the type bars are in this printing position, the closure of cam contacts C8 (Fig. 9a) will release the bar 125 so that the wipers 131 and 132 may drop down one step to contact the 1 segment 133, in which position the bar will then be latched so that, during the next cycle when the second detail card is sensed, a circuit will be completed through the magnet 90 at a time for positioning the print frame for printing on the second line of the master card.

Assuming now that the master card when sensed contains three entries, for example, as in Fig. 8, and the first detail card is to print on the next succeeding line 4 and then on line 5 and so on, at the time such master card is in sensing position a circuit is traceable from line 140 (Fig. 9), wire 148, switch 157, wire 160, the common strip 143 of emitter E1a, the wiper 145, the 3 segment 142, the 3 wire 164, the 3 hole 28 in the card, related common strip 56, wire 165, contacts C1b and magnet 90 to line 141. This will position the printing frame at the 3 line and will also position the wipers 131 and 132 at the 3 segment 133, where they will be set during the next cycle when the detail card is sensed. During such next cycle, emitter E2b will function to complete a circuit through its 4 segment 142 and wire 143, which is connected to the 3 segment 133 to thereby position the printing mechanism for recording on line 4 of the master card. Thus, the printing mechanism for this operation will cause recording of detail cards to take place on the next higher available recording line, and, if no recording has as yet been effected, on the first recording line.

There remains one further condition, namely, where the last recording has been in the field 26 of Fig. 8. For example, let it be assumed that such last recording was on line 20. With the master card in sensing position, a circuit is completed from line 140, wire 148, relay R2, the switch 158, the wire 166, emitter E1b, the 20 segment 143 thereof, the related wire 167, the hole 28 in the 20 line of the master card, contacts C1a closed during this period, to line 141. Relay R2 closes its contacts R2a to energize the shift relay S5 through a circuit from line 140, relay R2, contacts R2a, relay S5, switch 159 in the closed position, wire 168, contacts C9 and R1d in parallel, to line 141, through wire 147. During this period, contacts R1d are open since the master card is being sensed, contacts C9 are closed for the period indicated in Fig. 5 so that they hold the shift magnet energized shortly after relay R1 becomes deenergized, at which time the contacts R1b close to maintain the shift magnet S5 energized. Accordingly, the shift magnet will now remain energized during the sensing of any subsequent detail cards and until a new master card arrives, in which case relay R1 is energized to open its contacts R1d and break the circuit to the shift solenoid S5. Briefly stated, when a master card is sensed in which subsequent printing lines are all in field 26, the shift magnet is held energized.

A particular condition arises where the last recorded line on the master card is line 12 and the next recording is to be on line 13. In such case, as before, the sensing of the 12 hole in the master card will position the bar 125 (Fig. 9) with its wiper 131 at the 12 segment 133. In this position the second wiper 131a contacts a separate segment 133 and wiper 132a contacts a separate segment 135a, so that in the next following cycle, when a detail card is sensed, the circuit to emitter E2b is through the 1 segment 142 thereof, a wire 170, relay contacts R4b (closed as will be explained), wire 181, wire 163 (Fig. 9) and magnet 90 to line 141 to position the printing mechanism at the uppermost line. Prior to the completion of this circuit the emitter E2b completes circuit from its common conductor 143 (Fig. 9a), brush 145 lowermost segment 142, wire 180, lowermost segment 133, wipers 131a, 132a, segment 135a, relay R4, wire 171 (Fig. 9), shift solenoid S5, switch 159, wire 168, contacts C9, wire 147, to line 141.

Energization of solenoid S5 at this time will cause shifting of the printing frame laterally, and relay R4 will close its contacts R4a, R4b, the former to provide a holding circuit from line 140 (Fig. 9a), wire 172, contacts R1c, contacts R4a, relay R4, wire 171, solenoid S5, switch 159, and relay contacts R1d, to line 141, to maintain the shift magnet energized until the next master card is sensed.

It will be noted for this condition that bar 125 is initially positioned under control of the master card, to set wiper 131 at the 12 segment 133 and wiper 131a at the lowermost segment 133. During the next cycle, after relay R4 and shift solenoid have been energized as explained, the bar 125 moves upwardly with frame 80 so that wiper 131 successively contacts the 11, 10, 9, etc., segments 133, and the brush 145 of emitter E2b successively contacts the 12, 11, 10, 9, etc., segments 142, one step ahead of the wiper 131 so that no circuits can be completed between like numbered segments 142 and 133. When wiper 131 is at the 1 segment 133, brush 145 is at the 1 segment 142 and the print sectors are at the 1 line of the master card. It is at this time that the circuit traced through contacts R4b is completed to interrupt the frames 80 for printing on line 1. Pawl 129 will then hold bar 125 with wiper 131 at the 1 segment 133 so that in the following cycle when brush 145 engages the 2 segment 142 a circuit is completed to interrupt frame 80 for printing on line 2 of the master card.

There is thus provided a machine in which a single file of alternately arranged master and detail cards may be sensed and data from the detail cards, of which there may be one or more for each master card, will print and punch on selected lines or positions of the master card, with the particular position to receive such recording being determined by the master card itself, or alternatively by each related detail card. Further, the cards after a recording operation may be segregated or retained as a single file.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described having means for feeding cards of a single file, said file comprising master cards and one or more detail cards for each master card, with the detail cards following the related master cards, means for sensing the cards in succession for designations thereon, punching mechanism, operating means for said punching mechanism to effect punching in any one of a plurality of sequential punching positions on the master cards, and means controlled by the sensing means in response to the sensing of designations in the detail cards for rendering said operating means effective to punch a printing line control hole for each detail card in a selected position of the preceding related master card.

2. In a machine of the class described having means for feeding cards of a single file, said file comprising a plurality of master cards and a detail card following each master card, each master card having a plurality of punching positions thereon, punching mechanism, sensing means for sensing designations in the cards, and means controlled by said sensing means in response to the sensing of designations on a detail card for causing the punching mechanism to effect a perforation in one of the said plurality of punching positions of the preceding related master card, selected in accordance with the sensed designations on the detail card.

3. In a machine of the class described having means for feeding cards of a single file, said file comprising a plurality of master cards and a detail card following each master card, each master card having a plurality of recording positions thereon, recording mechanism, sensing means for sensing designations in the cards, and means controlled by said sensing means in response to the sensing of designations on a detail card for causing the recording mechanism to effect recording in one of said plurality of recording positions of the preceding related master card, selected in accordance with the sensed designations on the detail card.

4. In a machine of the class described having means for feeding cards of a single file, said file comprising a plurality of master cards each followed by a detail card, a sensing station having sensing means thereat, a punching station having punching means thereat, a detail card hopper, a master card hopper, feeding means for feeding each master card to said sensing station, said punching station and to said master card hopper and for feeding each detail card to said sensing station and to said detail card hopper, each master card having a sequentially arranged series of punching positions, means controlled by the sensing means upon sensing designations in a detail card for causing said punching means to punch in one of said punching positions, and means for selecting the punching position to be punched.

5. The invention set forth in claim 4 in which the punching position is selected under control of said sensing means in response to the sensing of a detail card.

6. The invention set forth in claim 4 in which the punching position is selected under control of the sensing means in response to the sensing of a master card.

7. The invention set forth in claim 4 in which the punching position is selectable under control of the sensing means in response to the sensing of either a master or a detail card and settable means is provided for rendering either type of card effective for controlling said selection.

8. In a machine of the class described having means for feeding cards of a single file, said file comprising a plurality of master cards each followed by one or more detail cards, a sensing station having sensing means thereat, a punching station having punching means thereat, a pair of discharge hoppers, feeding means for feeding a master card to said sensing station, then to said punching station, and then to one of said hoppers, means for retaining the master card at said punching station, said feeding means subsequently feeding the related detail cards to said sensing station in succession and thence to the other of said hoppers, and means controlled by said sensing means in response to the sensing of said detail cards for causing the punching means to effect punching on the master card and in a different position thereon for each detail card sensed.

9. The invention set forth in claim 8 in which means is controlled by said sensing means upon sensing a subsequent master card for causing said retaining means to release the preceding master card for feeding to the first named one of said hoppers.

10. In a machine of the class described having means for feeding cards of a single file comprising a succession of alternately arranged master and detail cards, means for sensing data on a detail card and designations on a master card, means for posting on a preceding master card data derived from a following detail card and means adapted to be operated by designations on the master card for selecting the position thereon to receive the data aforesaid.

11. In a machine of the class described having means for feeding cards of a single file comprising a succession of alternately arranged master and detail cards, means for sensing data and designations on the detail card, means for posting on a preceding master card data derived from a following detail card, and means adapted to be operated by designations on the detail card for selecting the position on the master card to receive the data aforesaid.

12. In a machine of the class described having means for feeding cards of a single file comprising a succession of alternately arranged master and detail cards, means for sensing data and designations on the detail card, or selectively data on the detail card and designations on the master card, means for posting on a preceding master card data derived from a following detail card, means adapted to be operated by designations on either the detail card or the master card for selecting the position on the master card to receive the data aforesaid, and manually settable means for rendering either the detail or the master card designations effective.

13. In a posting machine, means for advancing a succession of alternately arranged master and detail cards, means for reading perforations in the detail cards, means for posting on the preceding master cards the data derived from the said perforations, and means operable under control of said reading means for determining the position on the master card in which posting is to be effected.

14. In a posting machine, means for feeding a succession of detail and master cards from a single magazine, means for sensing data on said cards, means controlled by said sensing means for posting on preceding master cards data derived from the following detail card, and means for predetermining the position on the master card in which the data is to be posted.

15. In a posting machine, means for advancing a succession of master and detail cards from a single magazine, a sensing means for sensing each card advanced, means for advancing master cards along one path and detail cards along a second path after they have passed the sensing means, posting mechanism positioned in the path of the master cards, and means controlled by the sensing means in response to the sensing of detail cards for causing operation of said posting mechanism.

16. In a posting machine, means for advancing a card from a magazine, a posting mechanism, said advancing means causing positioning of the card adjacent to said posting mechanism, means for operating the posting mechanism to post on the card, means for effecting relative movement in two directions in the plane of the card between the card and said posting mechanism to effect posting in a selected column and row on the card, sensing means for sensing designations in the card prior to its advance to posting position, and means controlled by said sensing means for causing said relative movement to occur concurrently in said two directions, the extent of movement in each direction being in accordance with designations sensed in the card.

17. In a machine of the class described having means for feeding cards of a single file, said file comprising master cards and one or more detail cards for each master card, with the cards of one type following the related cards of the other type, means for sensing the cards in succession for data designations thereon, posting mechanism, operating means for said posting mechanism to effect posting in any one of a plurality of sequential posting positions on the master cards, and means controlled by the sensing means in response to the sensing of designations in the detail cards for rendering said operating means effective to post each detail card in a selected position of the related master card.

18. In a machine of the class described having means for feeding cards of a single file, said file comprising master cards and one or more detail cards for each master card, with the cards of one type following the related cards of the other type, each master card having posting positions thereon arranged in columns and rows, posting mechanism, operating means for said posting mechanism to effect posting in any one of said posting positions, and means controlled by the sensing means in response to the sensing of designations in the detail cards for rendering said operating means effective to record each detail card on its related master card by a designation in a column and row selected by the detail card.

WILLIAM LANG.